United States Patent
Fukudome et al.

(10) Patent No.: US 7,510,785 B2
(45) Date of Patent: Mar. 31, 2009

(54) CORROSION-RESISTANT SILICON NITRIDE CERAMICS

(75) Inventors: Takero Fukudome, Kokubu (JP); Sazo Tsuruzono, Kokubu (JP); Isao Yuri, Yokosuka (JP); Tohru Hisamatsu, Yokosuka (JP)

(73) Assignee: Kyocera Corporation, Kyoto (JP)

( * ) Notice: Subject to any disclaimer, the term of this patent is extended or adjusted under 35 U.S.C. 154(b) by 703 days.

(21) Appl. No.: 11/153,890

(22) Filed: Jun. 15, 2005

(65) Prior Publication Data

US 2006/0073361 A1   Apr. 6, 2006

(30) Foreign Application Priority Data

Jun. 18, 2004 (JP) ............... 2004-180932
Sep. 22, 2004 (JP) ............... 2004-275135

(51) Int. Cl.
*B32B 9/04* (2006.01)
*C04B 35/50* (2006.01)

(52) U.S. Cl. ............ 428/698; 428/701; 428/697; 428/689; 428/446; 428/448; 501/152; 501/154

(58) Field of Classification Search ............ None
See application file for complete search history.

(56) References Cited

U.S. PATENT DOCUMENTS

2003/0138641 A1 * 7/2003 Fukudome et al. ........ 428/446

FOREIGN PATENT DOCUMENTS

JP   05-238859   9/1993

* cited by examiner

*Primary Examiner*—Ling Xu
(74) *Attorney, Agent, or Firm*—Hogan & Hartson LLP

(57) ABSTRACT

A corrosion-resistant silicon nitride ceramics in which an adhesion enhancing layer (3), a stress relaxing layer (4) and a crack extension preventing layer (5) are laminated in this order on a ceramic substrate (2) composed mainly of silicon nitride, and a surface corrosion-resistant layer (6) composed mainly of zirconium oxide stabilized by an element of the group 3*a* of the periodic table is laminated. The thermal expansion coefficient ($\alpha_0$) of the ceramic substrate (2), the thermal expansion coefficient ($\alpha_1$) of the adhesion enhancing layer (3), and the thermal expansion coefficient ($\alpha_2$) of the stress relaxing layer (4), the thermal expansion coefficient ($\alpha_3$) of the crack extension preventing layer (5), and the thermal expansion coefficient ($\alpha_4$) of the surface corrosion-resistant layer (6) satisfy the following relational expressions (I) to (III):

$$\alpha_0 \approx \alpha_1 \quad (\text{I})$$

$$\alpha_3 < \alpha_2 \quad (\text{II})$$

$$\alpha_3 < \alpha_4 \quad (\text{III}).$$

16 Claims, 3 Drawing Sheets

CORROSION-RESISTANT SILICON NITRIDE CERAMICS

Priority is claimed to Japanese Patent Applications No. 2004-180932 filed on Jun. 18, 2004 and No. 2004-275135 filed on Sep. 22, 2004, the disclosure of which is incorporated by reference in its entirety.

BACKGROUND OF INVENTION

1. Field of the Invention

The present invention relates to corrosion-resistant silicon nitride ceramics suitable for members used at high temperature, in particular, to corrosion-resistant silicon nitride ceramics suitable for use as heat engine pants such as gas turbine engine parts.

2. Description of Related Art

Since silicon nitride traditionally known as engineering ceramics is excellent in heat resistance, thermal shock resistance, wear resistance, and oxidation resistance, the application of silicon nitride to heat engine parts such as gas turbines and turbo rotors is particularly proceeding.

For such silicon nitride ceramics, the characteristics of high density and high intensity can be obtained generally by adding sintering additives. For example, silicon nitride ceramics can be obtained by adding sintering additives such as $Y_2O_3$, $Al_2O_3$, and MgO to silicon nitride powder, followed by firing. This silicon nitride ceramics is usable in a high temperature range environment of not less than 1000° C. without cooling, in which it is impossible to use any metal material. This allows a small gas turbine to achieve a thermal efficiency as high as 40% and higher, which is not attainable with a traditional metal material.

Meanwhile, when silicon nitride ceramics is used as a heat engine member such as a gas turbine member, strength properties is not the only characteristic required in a high temperature environment. That is, it is required to have a high resistance to corrosion due to high temperature airflow, and also required to be excellent in wear resistance and shock resistance to collision with fine particles.

Silicon nitride ceramics, however, suffers from the problem that it reacts with high temperature moisture contained in the gas turbine combustion gas and is corroded and consumed, resulting in a remarkable short lifetime. The recession of ceramics due to high temperature combustion gas containing moisture is particularly pronounced in components such as combustor liners, transition ducts, and nozzles used in gas turbines.

For this reason, in addition to consideration of sintering additive and grain boundary phase, and consideration of firing condition, attempts to improve corrosion resistance by forming a coating layer on a substrate surface are being pursued. For example, Japanese Patent Application Publication Laid-Open No. 5-238859 discloses an attempt to improve peeling resistance as well as corrosion resistance by forming a coating layer composed of an under layer, an intermediate layer, and a surface layer, which are of oxide selected from zircon, zirconia, alumina, mullite, and yttria, on the surface of a silicon nitride ceramic substrate in the order in which thermal expansion coefficient increases from the substrate.

With the members described in this publication No. 5-238859, the residual stress due to the thermal expansion coefficient difference between the substrate and the surface layer can be relaxed by disposing the respective layers such that the thermal expansion coefficient increases sequentially. However, in the environment in which start and stop are repeated to cause a heat cycle involving a large temperature change as in a gas turbine, it is impossible to prevent extension (propagation) of a crack occurred in the surface layer. As a result, the crack can reach the substrate, which causes the problem of peeling in the coating layer such as the surface layer.

SUMMARY OF THE INVENTION

An advantage of the present invention is to provide a corrosion-resistant silicon nitride ceramics that can prevent a coating layer disposed on a substrate from peeling, even if using in an environment involving a heat cycle such as in a heat engine.

The present inventors have made many research efforts for solving the above problems and have completed the present invention by finding out the following fact. Specifically, by the arrangement that an intermediate layer is disposed between a ceramic substrate composed mainly of silicon nitride and a surface corrosion-resistant layer composed mainly of zirconium oxide, and the intermediate layer has a crack extension preventing layer interposed between layers having a large thermal expansion coefficient, if the surface corrosion-resistant layer had cracked, the crack extension preventing layer suppresses this crack extension, thereby preventing the crack from reaching the ceramic substrate. Therefore in an environment involving a heat cycle, it is possible to prevent a coating layer (the surface corrosion-resistant layer and the intermediate layer) from peeling from the ceramic substrate.

More specifically, in a first corrosion-resistant silicon nitride ceramics of the invention, a surface corrosion-resistant layer composed mainly of zirconium oxide stabilized by an element of the group 3a of the periodic table is laminated via an intermediate layer on a ceramic substrate composed mainly of silicon nitride. The intermediate layer is composed of a plurality of layers including at least one crack extension preventing layer. The crack extension preventing layer is disposed between layers having a larger thermal expansion coefficient than the said crack extension preventing layer.

Since the intermediate layer has the crack extension preventing layer interposed between the layers having a large thermal expansion coefficient, if the surface corrosion-resistant layer had cracked, it is possible to prevent this crack from extending to the ceramic substrate side. The reason why the crack does not extend can be inferred as follows. In general, once a small crack has initiated, it begins to extend (propagate) under tensile stress generated at the tip of this small crack. The crack extension preventing layer of the invention is interposed between the layers having a large thermal expansion coefficient, so that its interior is subjected to compressive stress. Therefore if the crack generated in the surface corrosion-resistant layer reached the crack extension preventing layer, no tensile stress occurs (acts) at the tip of the crack, and the crack extension preventing layer stops the crack extension.

This prevents the coating layer such as the surface corrosion-resistant layer from peeling from the ceramic substrate in the environment involving a heat cycle. Thus, the use of this corrosion-resistant silicon nitride ceramics as the material of heat engine parts etc. permits higher product reliability and a longer lifetime.

Preferably, the intermediate layer includes two or more crack extension preventing layers, and each one is disposed between layers having a larger thermal expansion coefficient than that. The presence of the two or more crack extension preventing layers in the intermediate layer enables a higher crack extension preventing effect to be obtained.

In a second corrosion-resistant silicon nitride ceramics of the invention, a surface corrosion-resistant layer composed mainly of zirconium oxide stabilized by an element of the group 3a of the periodic table is laminated via an intermediate layer on a ceramic substrate composed mainly of silicon nitride. The intermediate layer is composed of a stress relaxing layer and a crack extension preventing layer that are laminated in this order on the ceramic substrate, and that satisfy the following relational expressions (II) and (III):

$$\alpha_3 < \alpha_2 \tag{II}$$

$$\alpha_3 < \alpha_4 \tag{III}$$

wherein $\alpha_2$ is the thermal expansion coefficient of the stress relaxing layer; $\alpha_3$ is the thermal expansion coefficient of the crack extension preventing layer; and $\alpha_4$ is the thermal expansion coefficient of the surface corrosion-resistant layer.

In this corrosion-resistant silicon nitride ceramics, as indicated by the above expressions (II) and (III), the crack extension preventing layer is interposed between the stress relaxing layer and the surface corrosion-resistant layer, each having a larger thermal expansion coefficient than the crack extension preventing layer. By this arrangement, if the surface corrosion-resistant layer had cracked, the crack extension preventing layer prevents the crack from extending to the ceramic substrate side.

In a third corrosion-resistant silicon nitride ceramics of the invention, a surface corrosion-resistant layer composed mainly of zirconium oxide stabilized by an element of the group 3a of the periodic table is laminated via an intermediate layer on a ceramic substrate composed mainly of silicon nitride. The intermediate layer is composed of an adhesion enhancing layer, a stress relaxing layer, and a crack extension preventing layer that are laminated in this order on the ceramic substrate, and that satisfy the following relational expressions (I) to (III):

$$\alpha_0 \approx \alpha_1 \tag{I}$$

$$\alpha_3 < \alpha_2 \tag{II}$$

$$\alpha_3 < \alpha_4 \tag{III}$$

wherein $\alpha_0$ is the thermal expansion coefficient of the ceramic substrate; $\alpha_1$ is the thermal expansion coefficient of the adhesion enhancing layer; $\alpha_2$ is the thermal expansion coefficient of the stress relaxing layer; $\alpha_4$ is the thermal expansion coefficient of the crack extension preventing layer; and $\alpha_4$ is the thermal expansion coefficient of the surface corrosion-resistant layer.

Thus, more excellent adhesion between the ceramic substrate and the coating layer (the intermediate layer and the surface corrosion-resistant layer) can be obtained in the presence of the adhesion enhancing layer having approximately the same thermal expansion coefficient as the ceramic substrate, as indicated by the above expression (I), in addition to the above expressions (II) and (III).

Preferably, the thermal expansion coefficient $\alpha_0$ of the ceramic substrate, the thermal expansion coefficient $\alpha_2$ of the stress relaxing layer, and the thermal expansion coefficient $\alpha_4$ of the surface corrosion-resistant layer satisfy the following relational expression IV):

$$\alpha_0 < \alpha_2 < \alpha_4 \tag{IV}$$

Specifically, when the thermal expansion coefficient $\alpha_0$ of the ceramic substrate, the thermal expansion coefficient $\alpha_2$ of the stress relaxing layer, and the thermal expansion coefficient $\alpha_4$ of the surface corrosion-resistant layer satisfy the relational expression (IV), more specifically, when the respective layers are disposed such that $\alpha_0$, $\alpha_2$, and $\alpha_4$ are increased stepwise in this order, the stress relaxing layer relaxes the residual stress generated in the corrosion-resistant silicon nitride ceramics, thereby suppressing excessively large residual stress from occurring in the corrosion-resistant silicon nitride ceramics. This further increases the effect of preventing the coating layer such as the surface corrosion-resistant layer from peeling from the ceramic substrate.

More preferably, the thermal expansion coefficient $\alpha_0$ of the ceramic substrate and the thermal expansion coefficient $\alpha_3$ of the crack extension preventing layer satisfy the following relational expression (V):

$$|\alpha_3 - \alpha_0| \leq 1.5 \times 10^{-6}/^\circ C. \tag{V}$$

When $\alpha_3$ and $\alpha_0$ satisfy the above expression (V), namely, when the difference between the thermal expansion coefficient $\alpha_3$ of the crack extension preventing layer and the thermal expansion coefficient $\alpha_0$ of the ceramic substrate is small, the effect of preventing the coating layer such as the surface corrosion-resistant layer from peeling from the ceramic substrate can be further increased.

In a fourth corrosion-resistant silicon nitride ceramics of the invention, a surface corrosion-resistant layer composed mainly of zirconium oxide stabilized by an element of the group 3a of the periodic table is laminated via an intermediate layer on a ceramic substrate composed mainly of silicon nitride. The intermediate layer is composed of: (i) a stress relaxing layer composed mainly of a mixture of disilicate crystals of an element of the group 3a of the periodic table and zirconium oxide crystals stabilized by an element of the group 3a of the periodic table; and (ii) a crack extension preventing layer composed mainly of disilicate crystals of an element of the group 3a of the periodic table. The two layers are laminated in this order on the ceramic substrate.

In a fifth corrosion-resistant silicon nitride ceramics of the invention, a surface corrosion-resistant layer composed mainly of zirconium oxide stabilized by an element of the group 3a of the periodic table is laminated via an intermediate layer on a ceramic substrate composed mainly of silicon nitride. The intermediate layer is composed of: (i) an adhesion enhancing layer composed mainly of disilicate crystals of an element of the group 3a of the periodic table; (ii) a stress relaxing layer composed mainly of a mixture of disilicate crystals of an element of the group 3a of the periodic table and zirconium oxide crystals stabilized by an element of the group 3a of the periodic table; and (iii) a crack extension preventing layer composed mainly of disilicate crystals of an element of the group 3a of the periodic table. The three layers are laminated in this order on the ceramic substrate.

In the fourth and fifth corrosion-resistant silicon nitride ceramics, the disilicate crystals constituting the crack extension preventing layer is preferably composed of at least one selected from $Er_2Si_2O_7$, $Yb_2Si_2O_7$, and $Lu_2Si_2O_7$. More preferably, the crack extension preventing layer has approximately the same thermal expansion coefficient as the ceramic substrate.

In order for the thermal expansion coefficient of the respective layers to satisfy the above relationships, the adhesion enhancing layer, the stress relaxing layer and the crack extension preventing layer may be composed of the above-mentioned components, for example. Here, the disilicate crystals of an element of the group 3a of the periodic table indicates the crystals expressed by $RE_2Si_2O_7$, wherein RE indicates an element of the group 3a of the periodic table. In particular, RE is preferably at least one of Er, Yb and Lu, as described above.

Preferably, the crack extension preventing layer has a thickness of 5 to 200 μm, the surface corrosion-resistant layer has a thickness of 5 to 200 μm, and the adhesion enhancing layer and the stress relaxing layer have a thickness of 5 to 200 μm. This allows these layers to sufficiently exhibit their respective functions as above described.

Preferably, the surface corrosion-resistant layer is composed of a columnar crystal, and the long axis of the columnar crystal is approximately perpendicular to the surface of the ceramic substrate. When such stress as to cause a crack is exerted on the surface corrosion-resistant layer, it is possible to cause the crack along the interface of the columnar crystal. Therefore, the state in which the surface corrosion-resistant layer adheres to the crack extension preventing layer without peeling therefrom can be maintained more reliably.

In the surface corrosion-resistant layer, the sum of the contents of Al and Si is preferably not more than 1 mass %, and its porosity is preferably 1 to 30%. This further increases the corrosion resistance when exposed to high temperature moisture.

The surface corrosion-resistant layer may be cracked. Specifically, in the corrosion-resistant silicon nitride ceramics of the invention, the crack extension preventing layer can prevent crack extension. Accordingly excellent durability can be maintained if the surface corrosion-resistant layer had cracked. This eliminates the need for consideration whether or not a crack can occur, when selecting the material of the surface corrosion-resistant layer, and when forming the surface corrosion-resistant layer. As a result, there is a wider selection of materials that constitute the surface corrosion-resistant layer, and wider manufacturing tolerances in forming the surface corrosion-resistant layer.

Preferably, a crack coating layer for covering a crack in the surface corrosion-resistant layer is laminated on the surface corrosion-resistant layer. If the surface corrosion-resistant layer had cracked, the crack coating layer can cover it, so that no crack is exposed to the uppermost surface. This increases commercial value in terms of appearance.

DESCRIPTION PREFERRED EMBODIMENTS

Figure 1:
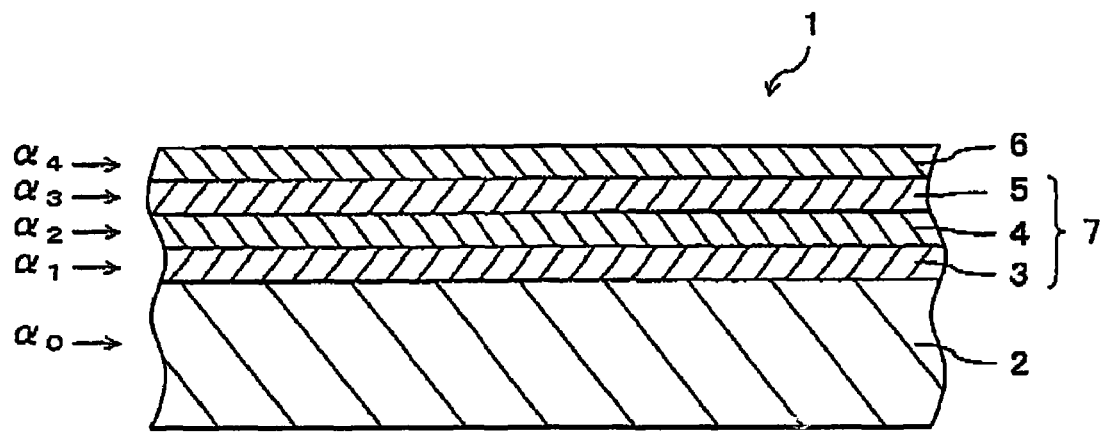
FIG. 1 is a sectional view showing a corrosion-resistant silicon nitride ceramics according to one preferred embodiment of the invention.

The following is a detailed description of a corrosion-resistant silicon nitride ceramics according to one preferred embodiment of the invention. FIG. 1 is a sectional view showing a corrosion-resistant silicon nitride ceramics 1 in this preferred embodiment. Referring to FIG. 1, in the corrosion-resistant silicon nitride ceramics 1, a surface corrosion-resistant layer 6 is laminated via an intermediate layer 7 on a ceramic substrate 2 composed mainly of silicon nitride. The intermediate layer 7 consists of an adhesion enhancing layer 3, a stress relaxing layer 4, and a crack extension preventing layer 5. These layers are laminated in this order on the ceramic substrate 2.

In the corrosion-resistant silicon nitride ceramics 1, the respective thermal expansion coefficients $\alpha_0$, $\alpha_1$, $\alpha_2$, $\alpha_3$ and $\alpha_4$ of the ceramic substrate 2, adhesion enhancing layer 3, stress relaxing layer 4, and crack extension preventing layer 5 satisfy the above-mentioned relational expressions (I) to (III). It is further preferable that the respective thermal expansion coefficients $\alpha_0$, $\alpha_2$, and $\alpha_4$ of the ceramic substrate 2, stress relaxing layer 4, and surface corrosion-resistant layer 6 satisfy the above-mentioned relational expression (IV); and that the respective thermal expansion coefficients $\alpha_0$, and $\alpha_3$ of the ceramic substrate 2 and crack extension preventing layer 5 satisfy the above-mentioned relational expression (V).

[Ceramic Substrate]

The ceramic substrate 2 is a silicon nitride sintered body composed mainly of silicon nitride and, as needed, any composition other than silicon nitride composition may be contained. Examples of other components are oxides of elements of the group 3a of the periodic table, silicate compounds such as disilicate and monosilicate, alumina, silica, and magnesium.

[Intermediate Layer]

As the materials of the adhesion enhancing layer 3, stress relaxing layer 4 and crack extension preventing layer 5, which constitute the intermediate layer 7, no special limitations is imposed, except that their respective thermal expansion coefficients $\alpha_2$, $\alpha_3$, and $\alpha_4$ satisfy the above expressions (I), (II), and (III). In terms of superiority in high temperature stability and corrosion resistance, it is preferred to use, as component, disilicate crystals of an element of the group 3a of the periodic table, which can be expressed by $RE_2Si_2O_7$ (RE indicates an element of the group 3a of the periodic table). Here, the element of the group 3a of the periodic table is at least one selected from Sc, Y, La, Ce, Pr, Nd, Pm, Sm, Eu, Gd, Tb, Dy, Ho, Er, Tm, Yb, and Lu. The disilicate of an element of the group 3a of the periodic table has high corrosion resistance to high temperature moisture and has a high melting point. Therefore, if a pin hole or a crack is present in the surface corrosion-resistant layer 6, its influence on the ceramic substrate 2 can be reduced, and hence this disilicate is effective as an intermediate layer.

More specifically, for example, the adhesion enhancing layer 3 is preferably composed mainly of disilicate crystals of an element of the group 3a of the periodic table. The stress relaxing layer 4 is preferably composed mainly of a mixture of disilicate crystals of an element of the group 3a of the periodic table and zirconium oxide crystals stabilized by an element of the group 3a of the periodic table. The crack extension preventing layer 5 is preferably composed mainly of disilicate crystals of an element of the group 3a of the periodic table.

It is especially preferred that at least one selected from $Er_2Si_2O_7$, $Yb_2Si_2O_7$, and $Lu_2Si_2O_7$ is used as disilicate. Since Er, Yb and Lu are small in ion radius and large in interionic bonding strength, any disilicate containing Er, Yr and Lu has a relatively small thermal expansion coefficient. This enables effective suppression of peeling of the coating layer such as the surface corrosion-resistant layer 6. Additionally, Y is preferred because it is less expensive than other elements of the group 3a of the periodic table.

The thermal expansion coefficient $\alpha_1$ of the adhesion enhancing layer 3 satisfies, the above-mentioned relational expression (I), as above described. In other words, it is preferred that $\alpha_0$ and $\alpha_1$ care approximately the same. Specifically, $\alpha_1=0.8\alpha_0$ to $1.2\alpha_0$, preferably, $\alpha_1=0.9\ \alpha_0$ to $1.1\ \alpha_0$, more preferably, $\alpha_1=0.95\ \alpha_0$ to $1.05\ \alpha_0$.

In the stress relaxing layer 4, the disilicate crystals content is 70 to 85 mass %, preferably, 75 to 80 mass %. The zirconium oxide crystal content is 15 to 30 mass %, preferably, 20 to 25 mass %. The content of an element of the group 3a of the periodic table in the zirconium oxide crystals of the stress relaxing layer 4 is preferably 3 to 15 mol %. The thermal expansion coefficient $\alpha_2$ of the stress relaxing layer 4 can be adjusted by changing the ratio of disilicate to zirconium oxide.

The thermal expansion coefficient $\alpha_3$ of the crack extension preventing layer 5 preferably satisfy not only the above expressions (II) and (III) but also the above expression (V). When the difference between the thermal expansion coefficient ca, of the crack extension preventing layer 5 and the thermal expansion coefficient $\alpha_0$ of the ceramic substrate 2 is small, as in the expression (V), preferably when the thermal expansion coefficients $\alpha_0$ and $\alpha_3$ are approximately the same, it is possible to further increase the effect of preventing the coating layer such as the surface corrosion-resistant layer 6 from peeling from the ceramic substrate 2. In case of $(\alpha_3-\alpha_0) >1.5\times10^{-6}/°C$. the difference between the thermal expansion coefficient $\alpha_3$ of the crack extension preventing layer 5 and the respective thermal expansion coefficients $\alpha_2$ and $\alpha_4$ of the stress relaxing layer 3 and the surface corrosion-resistant layer 6 is too small, and the compressive stress exerted on the crack extension preventing layer 5 becomes lessened, so that the crack extension preventing effect can become lessened. On the other hand, in case of $(\alpha_3-\alpha_0)<-1.5\times10^{-6}/°$ C., the difference between the thermal expansion coefficient $\alpha_3$ of the crack extension preventing layer 5 and the thermal expansion coefficient $\alpha_4$ of the surface corrosion-resistant layer 6 is too large, and the surface corrosion-resistant layer 6 can be apt to peel.

The adhesion enhancing layer 3, stress relaxing layer 4 and crack extension preventing layer 5 have a thickness of 5 to 200 µm, preferably 10 to 150 µm, more preferably 10 to 100 µm, and further preferably 15 to 50 µm. For the thickness over 200 µm, the respective layers can be apt to peel. For the thickness below 5 µm, the respective layers' functions such as the improvement of adhesion, stress relaxation and crack extension prevention cannot be obtained sufficiently.

The porosity of each layer constituting the intermediate layer 7 is preferably not more than 30%, more preferably not more than 10%. This is because, if a pinhole or a crack exists in the surface corrosion-resistant layer 6, its influence on the ceramic substrate 2 can be reduced.

[Surface Corrosion-Resistant Layer]

The surface corrosion-resistant layer 6 is composed mainly of zirconium oxide stabilized by an element of the group 3a of the periodic table. The content of an element of the group 3a of the periodic table in the zirconium oxide crystals falls in such a range in which zirconium oxide can be stabilized, and no strong influence can be exerted on the corrosion resistance to moisture. Specifically, it is preferably 3 to 15 mol %, more preferably 5 to 12 mol %. The surface corrosion-resistant layer 6 can be composed mainly of zirconium oxide stabilized by an element of the group 2a of the periodic table such as Ca, Mg etc.

The crystals constituting the surface corrosion-resistant layer 6 are preferably composed of a columnar crystal, and the long axis of the columnar crystal is preferably approximately perpendicular to the surface of the ceramic substrate 2. The reason for this is as follows. If the surface corrosion-resistant layer 6 had cracked due to thermal stress, a crack will occur at the interface of the columnar crystal. This enables more reliable maintenance of the state in which the surface corrosion-resistant layer 6 is adhered, without peeling from the crack extension preventing layer 5. In other words, when the surface corrosion-resistant layer 6 is composed of a columnar crystal approximately perpendicular to the surface of the ceramic substrate 2, a crack is apt to occur in a direction perpendicular to the ceramic substrate 2, and the crack is hard to extend parallel or obliquely to the ceramic substrate 2. In contrast, when it is not composed of such a columnar crystal, a crack can extend parallel or obliquely to the ceramic substrate 2, and cross another crack, which can cause the surface corrosion-resistant layer 6 to peel. The above-mentioned columnar crystal approximately perpendicular to the surface of the ceramic substrate 2 can be formed with Electro Beam-Physical Vapor Deposition (EB-PVD) method, for example.

In the surface corrosion-resistant layer 6, the sum of Al and Si is preferably not more than 1 mass %, more preferably not more than 0.1 mass %, further preferably not more than 0.01 mass %. For the sum over 1 mass %, the corrosion resistance to high temperature moisture is liable to deteriorate.

The porosity of the surface corrosion-resistant layer 6 is preferably 1 to 30%, more preferably 2 to 15%. Thereby, for example, when for particles collide with the surface corrosion-resistant layer 6 in a heat engine such as a gas turbine engine, the occurrence of a crack and the crack extension can be suppressed effectively so as to suppress chipping and peeling.

The thickness of the surface corrosion-resistant layer 6 is 5 to 200 µm, preferably 10 to 150 µm, more preferably 10 to 100 µm, and further preferably 15 to 50 µm. For the thickness below 5 µm, the surface corrosion-resistant layer 6 is liable to peel due to the collision of fine particles. For the thickness over 200 µm, the influence of thermal expansion coefficient difference with other layer is enhanced, and the surface corrosion-resistant layer 6 is liable to peel.

[Manufacturing Method]

A method of manufacturing the corrosion-resistant silicon nitride ceramics 1 will next be described.

First, to silicon nitride powder having a mean particle diameter of approximately 0.2 to 0.6 µm, sintering additive such as ruthenium oxide and silicon dioxide, and other component as needed, are added and mixed. To this mixture, binder and solvent etc. are likewise added and mixed to obtain a slurry. After drying the obtained slurry, this is formed by press forming, followed by firing at 1800 to 1900° C. for 5 to 10 hours, resulting in a ceramic substrate 2.

Subsequently, there is prepared slurries used as the raw materials of an adhesion enhancing layer 3, stress relaxing layer 4, crack extension preventing layer 5 and surface corrosion-resistant layer 6, respectively. These slurries are prepared by blending the respective components such that the thermal expansion coefficient after firing satisfies the above expressions (I) to (III), preferably the above expressions (I) to (V). Specifically, in the case where the adhesion enhancing layer is composed mainly of disilicate crystals of an element of the group 3a of the periodic table, the stress relaxing layer is composed mainly of a mixture of disilicate crystals of an element of the group 3a of the periodic table and zirconium oxide crystals stabilized by an element of the group 3a of the periodic table, and the crack extension preventing layer is composed mainly of disilicate crystals of an element of the group 3a of the periodic table, it is preferred that the after-firing thermal expansion coefficients $\alpha_0$, $\alpha_1$, $\alpha_2$, $\alpha_{31}$, and $\alpha_4$ fall within the following ranges:

$\alpha_0 = 3.0 \times 10^{-6}/°C$ to $3.8 \times 10^{-6}/°C$.

$\alpha_1 = 3.0 \times 10^{-6}/°C$ to $3.8 \times 10^{-6}/°C$.

$\alpha_2 = 5.0 \times 10^{-6}/°C$ to $6.5 \times 10^{-6}/°C$.

$\alpha_3 = 3.0 \times 10^{-6}/°C$ to $3.8 \times 10^{-6}/°C$.

$\alpha_4 = 10 \times 10^{-6}/°C$ to $11 \times 10^{-6}/°C$.

Subsequently, with a spray gun, the slurry for an adhesion enhancing layer 3 is sprayed and applied to the surface of the ceramic substrate 2, followed by drying and heat treatment at 1400 to 1700° C. for 0.5 to 5 hours, resulting in the adhesion enhancing layer 3. Likewise, with a spray gun, the slurry for a stress relaxing layer 4 is sprayed and applied to the surface of the adhesion enhancing layer 3, followed by drying and heat treatment, resulting in the stress relaxing layer 4. Further, with a spray gun, the slurry for a crack extension preventing layer 5 is sprayed and applied to the surface of the stress relaxing layer 4, followed by drying and heat treatment, resulting in the crack extension preventing layer 5. Finally, with a spray gun, the slurry for a surface corrosion-resistant layer 6 is sprayed and applied to the surface of the crack extension preventing layer 5, followed by drying and heat treatment, resulting in the surface corrosion-resistant layer 6.

Instead of separately firing the adhesion enhancing layer 3, stress relaxing layer 4, crack extension preventing layer 5 and surface corrosion-resistant layer 6, the following method may be employed, for example. The slurries for the respective layers are sequentially applied onto the ceramic substrate 2. After drying, these layers are fired at the same time. Besides the method of applying the slurries as above described, thin film forming methods such as deposition method, CVD method, and sputtering method, as well as thermal spraying method may be employed to form the adhesion enhancing layer 3, stress relaxing layer 4, crack extension preventing layer 5, and surface corrosion-resistant layer 6.

Other Preferred Embodiments

Figure 2:
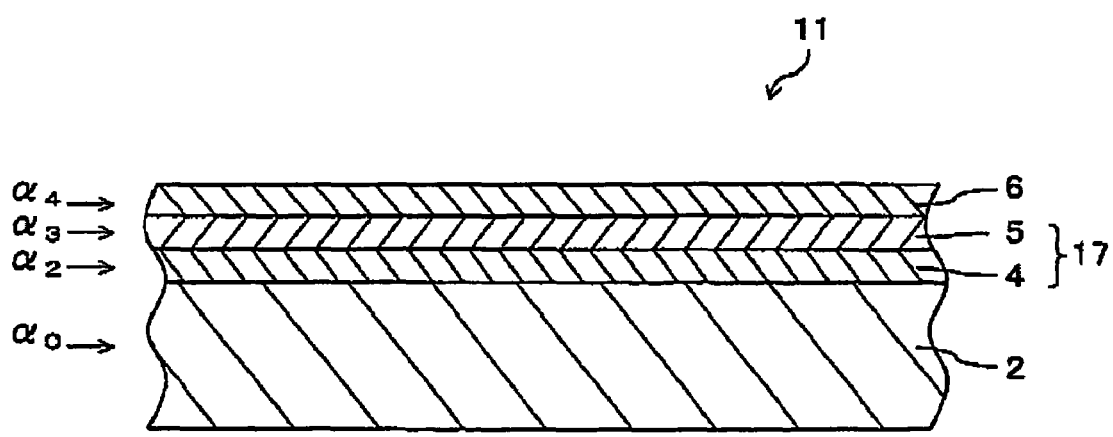
FIG. 2 is a sectional view showing a corrosion-resistant silicon nitride ceramics according to other preferred embodiment of the invention

FIG. 2 is a sectional view showing a corrosion-resistant silicon nitride ceramics according to other preferred embodiment of the invention. As shown in FIG. 2, in a corrosion-resistant silicon nitride ceramics 11, a surface corrosion-resistant layer 6 is laminated via an intermediate layer 17 on a ceramic substrate 2. The intermediate layer 17 consists of a stress relaxing layer 4 and a crack extension preventing layer 5 that are laminated in this order on the ceramic substrate 2. That is, the corrosion-resistant silicon nitride ceramics 11 is the same as the corrosion-resistant silicon nitride ceramics 1, except for the absence of the adhesion enhancing layer 3. This enables to simplify the manufacturing steps and reduce the cost.

In the corrosion-resistant silicon nitride ceramics 11, the ceramic substrate 2, intermediate layer 17 and surface corrosion-resistant layer 6 satisfy the above relational expressions (II) and (III). The crack extension preventing layer 5 is interposed between the stress relaxing layer 4 (of thermal expansion coefficient $\alpha_2$) and the surface corrosion-resistant layer 6 (of thermal expansion coefficient $\alpha_4$), both of which have a greater thermal expansion coefficient than the crack extension preventing layer 5. Thereby, if the surface corrosion-resistant layer 6 had cracked, it is avoidable that this crack extends toward the ceramic substrate 2. Otherwise, this preferred embodiment is identical to that described with respect to FIG. 1. Therefore like parts are identified by the same reference numerals as in FIG. 1, and their descriptions are omitted here.

Figure 3:
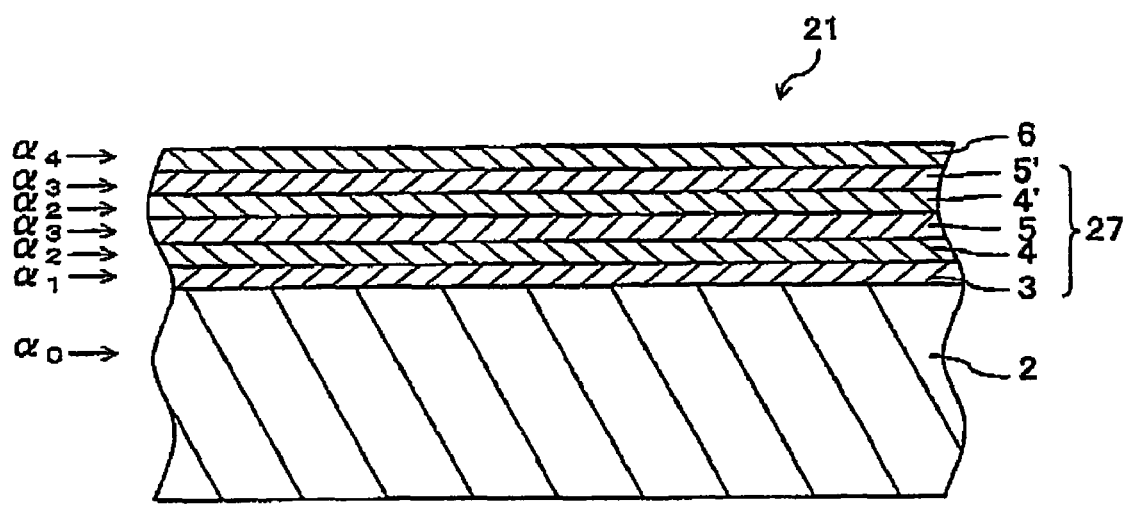
FIG. 3 is a sectional view showing a corrosion-resistant silicon nitride ceramics according to a still other preferred embodiment of the invention.

FIG. 3 is a sectional view showing a corrosion-resistant silicon nitride ceramics according to still other preferred embodiment of the invention. As shown in FIG. 3, a corrosion-resistant silicon nitride ceramics 21 differs from the corrosion-resistant silicon nitride ceramics 1 in an intermediate layer 27. The intermediate layer 27 is composed of a plurality of layers containing two crack extension preventing layers 5 and 5'.

In the corrosion-resistant silicon nitride ceramics 21, a ceramic substrate 2, intermediate layer 27, and surface corrosion-resistant layer 6 satisfy the above relational expressions (I) to (III). Specifically, the crack extension preventing layer 5 is interposed between a stress relaxing layer 4 (of thermal expansion coefficient $\alpha_2$) and a stress relaxing layer 4' (of thermal expansion coefficient $\alpha_2$), both of which have a greater thermal expansion coefficient than the crack extension preventing layer 5. The crack extension preventing layer 5' is interposed between the stress relaxing layer 4' (of thermal expansion coefficient $\alpha_2$) and the surface corrosion-resistant layer 6 (of thermal expansion coefficient $\alpha_4$), both of which have a greater thermal expansion coefficient than the crack extension preventing layer 5'. Thus, the presence of the two crack extension preventing layers 5 and 5' in the intermediate layer 27 provides higher crack extension preventing effect. Otherwise, this preferred embodiment is identical to that described with respect to FIG. 1. Therefore like parts are identified by the same reference numerals as in FIG. 1, and their descriptions are omitted here.

Figure 4:
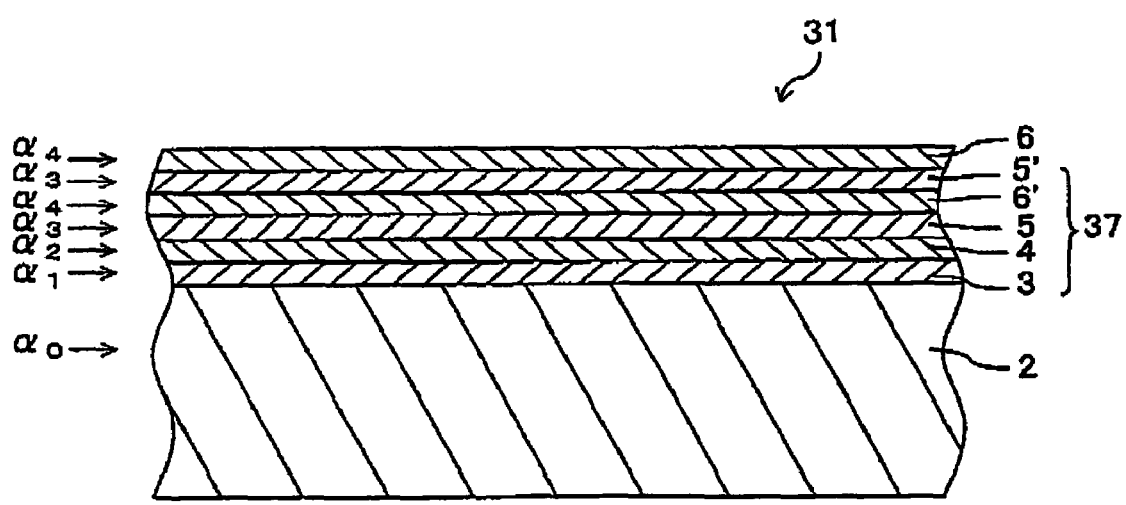
FIG. 4 is a sectional view showing a corrosion-resistant silicon nitride ceramics according to a still other preferred embodiment of the invention.

FIG. 4 is a sectional view showing a corrosion-resistant silicon nitride ceramics according to still other preferred embodiment of the invention. As shown in FIG. 4, in a corrosion-resistant silicon nitride ceramics 31, an intermediate layer 37 is composed of a plurality of layers including two crack extension preventing layers 5 and 5', and further including a corrosion-resistant layer 6'. The corrosion-resistant layer 6' is a layer excellent in corrosion resistance, which is composed mainly of the same component as the above-mentioned surface corrosion-resistant layer 6, namely, zirconium oxide stabilized by an element of the group 3a of the periodic table. Its thermal expansion coefficient is approximately the same as the surface corrosion-resistant layer 6.

In the corrosion-resistant silicon nitride ceramics 31, a ceramic substrate 2, intermediate layer 37, and surface corrosion-resistant layer 6 satisfy the above relational expressions (I) to (III). Specifically, a crack extension preventing layer 5 is interposed between a stress relaxing layer 4 (of thermal expansion coefficient $\alpha_2$) and a corrosion-resistant layer 6' (of thermal expansion coefficient $\alpha_4$), both of which have a greater thermal expansion coefficient than the crack extension preventing layer 5. The crack extension preventing layer 5' is interposed between the corrosion-resistant layer 6' (of thermal expansion coefficient $\alpha_4$) and the surface corrosion-resistant layer 6 (of thermal expansion coefficient $\alpha_4$), both of which have a greater thermal expansion coefficient than the crack extension preventing layer 5'. Thus, like the above-mentioned intermediate layer 27, the presence of the two crack extension preventing layers 5 and 5' in the intermediate layer 37 enables higher crack extension preventing effect. In addition, the presence of the two corrosion-resistant layers (the surface corrosion-resistant layer 6 and the corrosion-resistant layer 6') provides an enhanced corrosion resistance. Otherwise, this preferred embodiment is identical to that described with respect to FIG. 1. Therefore like parts are identified by the same reference numerals as in FIG. 1, and their descriptions are omitted here.

Figure 5:
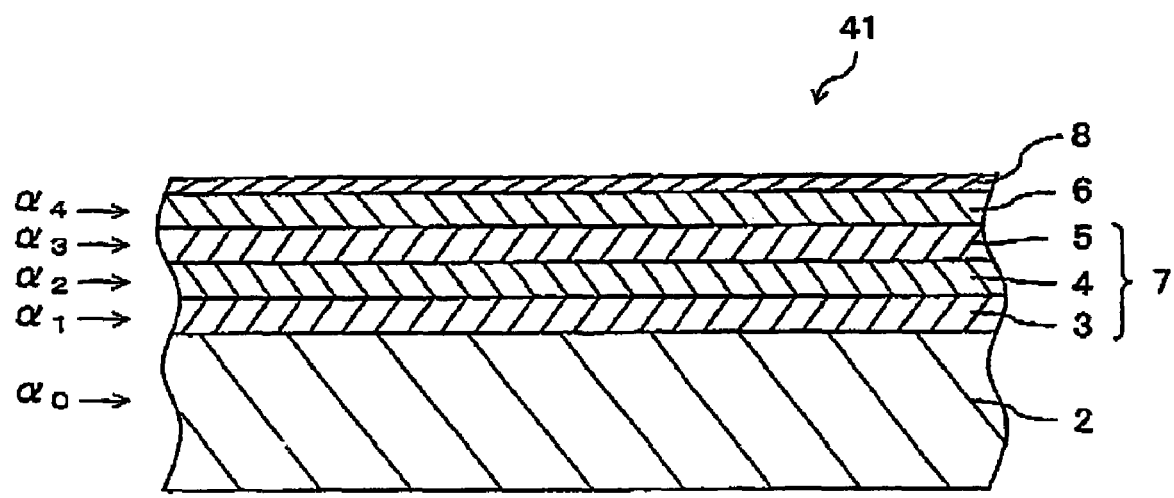
FIG. 5 is a sectional view showing a corrosion-resistant silicon nitride ceramics according to a still other preferred embodiment of the invention.

FIG. 5 is a sectional view showing a corrosion-resistant silicon nitride ceramics according to still other preferred embodiment of the invention. As shown in FIG. 5, a corrosion-resistant silicon nitride ceramics 41 differs from the corrosion-resistant silicon nitride ceramics 1, in that a crack coating layer 8 is further laminated on the surface corrosion-resistant layer 6. Accordingly if the surface corrosion-resistant layer 6 had cracked, the crack coating layer 8 can cover it, so that no crack is exposed to the uppermost surface. This increases commercial value in terms of appearance.

It is particularly important that the crack coating layer 8 is excellent in corrosion resistance. For this reason, its main component is preferably zirconium oxide stabilized by an element of the group 3a of the periodic table that is of high corrosion resistance. Additionally, it is preferred to have such a structure that the horizontal bonding is weak and the vertical bonding is strong with respect to the ceramic substrate 2. Specifically, the crack coating layer 8 is composed of a columnar crystal formed by EB-PVD method. It is also desirable that the long axis of the columnar crystal is approximately perpendicular to the surface of the ceramic substrate 2. The crack coating layer 8 can also be formed by applying a slurry onto the surface of the surface corrosion-resistant layer 6, followed by drying and heat treatment. For this method, the densification in a horizontal direction can be suppressed and the densification in a vertical direction can be facilitated by using zirconium oxide stabilized by an element of the group 3a of the periodic table that is large in particle diameter. Otherwise, this preferred embodiment is identical to that described with respect to FIG. 1. Therefore like parts are identified by the same reference numerals as in FIG. 1, and their descriptions are omitted here.

While the foregoing preferred embodiments describe the case where the disilicate crystals of an element of the group 3a of the periodic table are used as the material of the adhesion enhancing layer 3, stress relaxing layer 4, and crack extension preventing layer 5 that constitute the intermediate layer 7, the corrosion-resistant silicon nitride ceramics of the invention can employ monosilicate, mullite, and cordierite in the elements of the group 3a of the periodic table, as the material constituting the intermediate layer.

The corrosion-resistant silicon nitride ceramics of the invention may contain at least one crack extension preventing layer in the intermediate layer, and imposes no special limitations upon the components of layers constituting the intermediate layer and the number of layers. Accordingly the intermediate layer may contain three or more crack extension preventing layers.

Since the corrosion-resistant silicon nitride ceramics of the invention so constructed is particularly excellent in oxidation resistance and corrosion resistance to moisture, it is suitable for use as heat engine parts such as gas turbine engine parts, e.g. turbine rotors, nozzles, combustor liners, and transition ducts.

EXAMPLES

The invention will be described in more detail through examples and comparative examples. However, it is to be understood that the corrosion-resistant silicon nitride ceramics of the invention is not limited to the following examples.

[Sample Nos. 1 to 19]

Test pieces of Sample Nos. 1 to 19 of the form as shown in FIG. 1 were prepared in the following procedure.

[Ceramic Substrate]

To silicon nitride powder having a mean particle diameter of 0.5 µm, a 3 mol % of ruthenium oxide and a 6 mol % of silicon dioxide were added as sintering additive. This mixture was fired at 1900° C. for 10 hours, thereby obtaining a silicon nitride sintered body (a ceramic substrate). This ceramic substrate was then processed into the shape of 4 mm high, 40 mm wide and 3 mm thick. The thermal expansion coefficient $\alpha_0$ of this ceramic substrate was $3.5\times10^{-6}/°$ C.

[Adhesion Enhancing Layer]

A slurry was prepared from at least one type of powder selected from $Er_2Si_2O_7$, $Yb_2Si_2O_7$, and $Lu_2Si_2O_7$, whose thermal expansion coefficient was closer to that of the obtained ceramic substrate. With a spray gun, this slurry was sprayed and applied to the surface of the ceramic substrate, followed by drying and heat treatment at 1650° C. for one hour, resulting in an adhesion enhancing layer having a thickness and a thermal expansion coefficient $\alpha_1$ that were presented in Table 1.

[Stress Relaxing Layer]

There was prepared a slurry composed of a mixed powder consisting of at least one type of powder selected from $Er_2Si_2O_7$, $Yb_2Si_2O_7$, and $Lu_2Si_2O_7$, whose thermal expansion coefficient was a mid point between the thermal expansion coefficient $\alpha_0$ of the ceramic substrate and the thermal expansion coefficient $\alpha_4$ of the surface corrosion-resistant layer, and zirconium oxide powder stabilized by Y. With a spray gun, this slurry was sprayed and applied to the surface of the adhesion enhancing layer, followed by drying and heat treatment at 1630° C. for one hour, resulting in a stress relaxing layer having a thickness and a thermal expansion coefficient $\alpha_2$ that were presented in Table 1. In the stress relaxing layer after firing, the zirconium oxide content was 20 mass %, and the disilicate content was 80 mass %.

[Crack Extension Preventing Layer]

A slurry composed of at least one type of powder selected from $Er_2Si_2O_7$, $Yb_2Si_2O_7$, and $X-U_2Si_2O_7$ was prepared. With a spray gun, this slurry was sprayed and applied to the surface of the stress relaxing layer, followed by drying and heat treatment at 1600° C. for one hour, resulting in a crack extension preventing layer having a thickness and a thermal expansion coefficient $\alpha_3$ that were presented in Table 1.

[Surface Corrosion-Resistant Layer]

A slurry containing zirconia powder of 99.9% purity and powder of stabilizer shown in Table 1 was prepared. With a spray gun, this slurry was sprayed and applied to the surface of the crack extension preventing layer, followed by drying and heat treatment at 1600° C. for one hour, resulting in a surface corrosion-resistant layer having a thickness of 15 µm.

[Sample Nos. 20 and 21]

A ceramic substrate was prepared in the same manner as in the above sample Nos. 1 to 19, except that mullite or cordierite powder was contained in a slurry as the material of an adhesion enhancing layer, stress relaxing layer and crack extension preventing layer. On this ceramic substrate, an adhesion enhancing layer, a stress relaxing layer and a surface corrosion-resistant layer were formed to obtain test pieces of Sample Nos. 20 and 21. In the stress relaxing layer after firing, the zirconium oxide content was 20 mass %, and the disilicate content was 60 mass %, and the mullite or cordierite content was 20 mass %.

[Sample No. 25]

A test piece of Sample No. 25 having such a structure as shown in FIG. 2 was obtained by forming the respective layers in the same thickness and with the same material as in Sample No. 2, except for the absence of adhesion enhancing layer.

[Sample No. 26]

A test piece of Sample No. 26 was obtained by forming the respective layers in the same thickness and with the same material as in Sample No. 2, except that a stress relaxing layer 4' and a crack extension preventing layer 5' were formed between a crack extension preventing layer 5 and a surface corrosion-resistant layer 6, as shown in FIG. 3. The stress relaxing layer 4' was formed with the same material and in the same thickness as the stress relaxing layer 4. The crack extension preventing layer 5' was formed with the same material and in the same thickness as in the crack extension preventing layer 5.

[Sample No. 27]

A test piece of Sample No. 27 was obtained by forming the respective layers in the same thickness and with the same material as in Sample No. 2, except that a corrosion-resistant layer 6' and a crack extension preventing layer 5' were formed between a crack extension preventing layer 5 and a surface corrosion-resistant layer 6, as shown in FIG. 4. The corrosion-resistant layer 6' was formed with the same material and in the same thickness as the surface corrosion-resistant layer 6. The crack extension preventing layer 5' was formed with the same material and in the same thickness as in the crack extension preventing layer S.

[Sample No. 28]

A test piece of Sample No. 28 was obtained by forming the respective layers in the same thickness and with the same material as in Sample No. 2, except that a crack coating layer 8 was formed on the surface of the surface corrosion-resistant layer 6, as shown in FIG. 5. The crack coating layer 8 was formed with the material shown in Table 2, and composed of a columnar crystal formed by EB-PVD method. The long axis of the columnar crystal was approximately perpendicular to the surface of the ceramic substrate 2.

Comparative Examples

[Sample Nos. 22 to 24]

A ceramic substrate was prepared in the same manner as in Sample Nos. 1 to 19, except for the absence of crack extension preventing layer. On this ceramic substrate, an adhesion enhancing layer, a stress relaxing layer and a surface corrosion-resistant layer were formed to obtain test pieces of Sample Nos. 22 to 24.

[Evaluation]

A thermal shock test was conducted by using the test pieces of Sample Nos. 1 to 28 so obtained. After 1000 cycles of a heat cycle test in which a temperature increase up to 1300° C. and a temperature decrease up to 300° C. were repeated, it was observed on a microscope whether or not the surface corrosion-resistant layer had peeling. The observation of peeling was conducted per 100 cycles. Table 1 shows the results.

The thermal expansion coefficient of each layer was determined by preparing a sintered body having the same composition as each layer, and measuring the thermal expansion coefficient of this sintered body in a temperature range of 40 to 1200° C. with TMA method (JIS R 1618). The porosity was determined in the following manner. Specifically, a cross-section of each sample was subjected to mirror finish; voids in an image were found by observing this cross section on a song electron microscope (SEM); and the voids were subjected to image processing and quantified. The shapes of crystals were observed on the SEM and evaluated. In Table 1. "MU" indicates mullite, "CJ" indicates cordierite, "Columnar" indicates a columnar crystal, and "Perpendicular" indicates that the long axis of crystals is approximately perpendicular to the ceramic substrate surface.

TABLE 1

| | Composition | | | | | | | | | | |
|---|---|---|---|---|---|---|---|---|---|---|---|
| | Ceramic Substrate | | Intermediate layer | | | | | | | | |
| | | | Adhesion enhancing layer | | | Stress relaxing layer | | | Crack extension preventing layer | | |
| Sample No. | Type | $\alpha_0$ $10^{-6}/°C$ | Type | Thickness μm | $\alpha_1$ $10^{-6}/°C$ | Type | Thickness μm | $\alpha_2$ $10^{-6}/°C$ | Type | Thickness μm | $\alpha_3$ $10^{-6}/°C$ | $|\alpha_3 - \alpha_0|$ $10^{-6}/°C$ |
| 1 | $Si_3N_4$ | 3.5 | $Lu_2Si_2O_7$ | 30 | 3.8 | $Lu_2Si_2O_7 + ZrO_2$ | 15 | 5.8 | $Lu_2Si_2O_7$ | 15 | 3.8 | 0.3 |
| 2 | $Si_3N_4$ | 3.5 | $Yb_2Si_2O_7$ | 30 | 3.3 | $Yb_2Si_2O_7 + ZrO_2$ | 15 | 5.6 | $Yb_2Si_2O_7$ | 15 | 3.6 | 0.1 |
| 3 | $Si_3N_4$ | 3.5 | $Er_2Si_2O_7$ | 30 | 3.0 | $Er_2Si_2O_7 + ZrO_2$ | 15 | 5.0 | $Er_2Si_2O_7$ | 15 | 3.0 | 0.5 |
| 4 | $Si_3N_4$ | 3.5 | $Yb_2Si_2O_7$ | 30 | 3.6 | $Yb_2Si_2O_7 + ZrO_2$ | 15 | 5.6 | $Lu_2Si_2O_7$ | 15 | 3.8 | 0.3 |
| 5 | $Si_3N_4$ | 3.5 | $Yb_2Si_2O_7$ | 30 | 3.6 | $Yb_2Si_2O_7 + ZrO_2$ | 15 | 5.6 | $Er_2Si_2O_7$ | 15 | 3.0 | 0.5 |
| 6 | $Si_3N_4$ | 3.5 | $Yb_2Si_2O_7$ | 30 | 3.6 | $Yb_2Si_2O_7 + ZrO_2$ | 15 | 5.6 | $Yb_2Si_2O_7$ | 15 | 3.6 | 0.1 |
| 7 | $Si_3N_4$ | 3.5 | $Yb_2Si_2O_7$ | 30 | 3.6 | $Yb_2Si_2O_7 + ZrO_2$ | 15 | 5.6 | $Yb_2Si_2O_7$ | 15 | 3.6 | 0.1 |
| 8 | $Si_3N_4$ | 3.5 | $Yb_2Si_2O_7$ | 30 | 3.6 | $Yb_2Si_2O_7 + ZrO_2$ | 15 | 5.6 | $Yb_2Si_2O_7$ | 15 | 3.6 | 0.1 |
| 9 | $Si_3N_4$ | 3.5 | $Yb_2Si_2O_7$ | 30 | 3.6 | $Yb_2Si_2O_7 + ZrO_2$ | 15 | 5.6 | $Yb_2Si_2O_7$ | 15 | 3.6 | 0.1 |
| 10 | $Si_3N_4$ | 3.5 | $Yb_2Si_2O_7$ | 30 | 3.6 | $Yb_2Si_2O_7 + ZrO_2$ | 15 | 5.6 | $Yb_2Si_2O_7$ | 15 | 3.6 | 0.1 |
| 11 | $Si_3N_4$ | 3.5 | $Yb_2Si_2O_7$ | 30 | 3.6 | $Yb_2Si_2O_7 + ZrO_2$ | 15 | 5.6 | $Yb_2Si_2O_7$ | 15 | 3.6 | 0.1 |
| 12 | $Si_3N_4$ | 3.5 | $Yb_2Si_2O_7$ | 30 | 3.6 | $Yb_2Si_2O_7 + ZrO_2$ | 15 | 5.6 | $Yb_2Si_2O_7$ | 15 | 3.6 | 0.1 |
| 13 | $Si_3N_4$ | 3.5 | $Yb_2Si_2O_7$ | 30 | 3.6 | $Yb_2Si_2O_7 + ZrO_2$ | 15 | 5.6 | $Yb_2Si_2O_7$ | 15 | 3.6 | 0.1 |
| 14 | $Si_3N_4$ | 3.5 | $Yb_2Si_2O_7$ | 30 | 3.6 | $Yb_2Si_2O_7 + ZrO_2$ | 15 | 5.6 | $Yb_2Si_2O_7$ | 15 | 3.6 | 0.1 |
| 15 | $Si_3N_4$ | 3.5 | $Yb_2Si_2O_7$ | 5 | 3.6 | $Yb_2Si_2O_7 + ZrO_2$ | 5 | 5.6 | $Yb_2Si_2O_7$ | 5 | 3.6 | 0.1 |
| 16 | $Si_3N_4$ | 3.5 | $Yb_2Si_2O_7$ | 20 | 3.6 | $Yb_2Si_2O_7 + ZrO_2$ | 10 | 5.6 | $Yb_2Si_2O_7$ | 10 | 3.6 | 0.1 |
| 17 | $Si_3N_4$ | 3.5 | $Yb_2Si_2O_7$ | 100 | 3.6 | $Yb_2Si_2O_7 + ZrO_2$ | 100 | 5.6 | $Yb_2Si_2O_7$ | 100 | 3.6 | 0.1 |
| 18 | $Si_3N_4$ | 3.5 | $Yb_2Si_2O_7$ | 150 | 3.6 | $Yb_2Si_2O_7 + ZrO_2$ | 150 | 5.6 | $Yb_2Si_2O_7$ | 150 | 3.6 | 0.1 |
| 19 | $Si_3N_4$ | 3.5 | $Yb_2Si_2O_7$ | 200 | 3.6 | $Yb_2Si_2O_7 + ZrO_2$ | 200 | 5.6 | $Yb_2Si_2O_7$ | 200 | 3.6 | 0.1 |
| 20 | $Si_3N_4$ | 3.5 | MU + $Lu_2Si_2O_7$ | 30 | 3.5 | MU + $Yb_2Si_2O_7$ + $ZrO_2$ | 15 | 5.5 | MU + $Er_2Si_2O_7$ | 15 | 3.5 | 0 |
| 21 | $Si_3N_4$ | 3.5 | CJ + | 30 | 3.2 | CJ + $Lu_2Si_2O_7$ + | 15 | 5.3 | CJ + | 15 | 3.2 | 0.3 |

TABLE 1-continued

| | | | Yb₂Si₂O₇ | | | ZrO₂ | | | Lu₂Si₂O₇ | | | |
|---|---|---|---|---|---|---|---|---|---|---|---|---|
| * 22 | Si₃N₄ | 3.5 | Lu₂Si₂O₇ | 30 | 3.8 | Lu₂Si₂O₇ + ZrO₂ | 15 | 5.8 | — | — | — | — |
| * 23 | Si₃N₄ | 3.5 | Yb₂Si₂O₇ | 30 | 3.6 | Yb₂Si₂O₇ + ZrO₂ | 15 | 5.6 | — | — | — | — |
| * 24 | Si₃N₄ | 3.5 | Er₂Si₂O₇ | 30 | 3.0 | Er₂Si₂O₇ + ZrO₂ | 15 | 5.0 | — | — | — | — |
| 25 | Si₃N₄ | 3.5 | — | — | — | Yb₂Si₂O₇ + ZrO₂ | 15 | 5.6 | Yb₂Si₂O₇ | 15 | 3.6 | 0.1 |
| 26 | Si₃N₄ | 3.5 | Yb₂Si₂O₇ | 30 | 3.6 | Yb₂Si₂O₇ + ZrO₂ | 15 | 5.6 | Yb₂Si₂O₇ | 15 | 3.6 | 0.1 |
| 27 | Si₃N₄ | 3.5 | Yb₂Si₂O₇ | 30 | 3.6 | Yb₂Si₂O₇ + ZrO₂ | 15 | 5.6 | Yb₂Si₂O₇ | 15 | 3.6 | 0.1 |
| 28 | Si₃N₄ | 3.5 | Yb₂Si₂O₇ | 30 | 3.6 | Yb₂Si₂O₇ + ZrO₂ | 15 | 5.6 | Yb₂Si₂O₇ | 15 | 3.6 | 0.1 |

| | Composition Surface corrosion-resistant layer | | | | | | | | Feature | |
|---|---|---|---|---|---|---|---|---|---|---|
| | Stabilizer | | | | | | | | Thermal shock test | |
| | | Added | Impurity | | | | | | | |
| Sample No. | Type | Type | amount moll % | Al mass % | Si mass % | $\alpha_4$ $10^{-6}/°C$ | Crystal Shape | Direction | Crack (1) | Porosity % | result cycle |
|---|---|---|---|---|---|---|---|---|---|---|---|
| 1 | ZrO₂ | Y₂O₃ | 8 | <0.01 | <0.01 | 10.5 | Equiaxial | — | Exist | 9 | >1000 |
| 2 | ZrO₂ | Y₂O₃ | 8 | <0.01 | <0.01 | 10.5 | Equiaxial | — | Exist | 9 | >1000 |
| 3 | ZrO₂ | Y₂O₃ | 8 | <0.01 | <0.01 | 10.5 | Equiaxial | — | Exist | 10 | >1000 |
| 4 | ZrO₂ | Y₂O₃ | 8 | <0.01 | <0.01 | 10.5 | Equiaxial | — | Exist | 10 | >1000 |
| 5 | ZrO₂ | Y₂O₃ | 8 | <0.01 | <0.01 | 10.5 | Equiaxial | — | Exist | 11 | >1000 |
| 6 | ZrO₂ | Y₂O₃ | 8 | <0.01 | <0.01 | 10.5 | Columnar | Perpendicular | Exist | 15 | >1000 |
| 7 | ZrO₂ | Y₂O₃ | 8 | 1 | 1 | 10.5 | Equiaxial | — | Exist | 10 | >1000 |
| 8 | ZrO₂ | Lu₂O₃ | 8 | <0.01 | <0.01 | 10 | Equiaxial | — | Exist | 9 | >1000 |
| 9 | ZrO₂ | Yb₂O₃ | 8 | <0.01 | <0.01 | 10.3 | Equiaxial | — | Exist | 8 | >1000 |
| 10 | ZrO₂ | Er₂O₃ | 8 | <0.01 | <0.01 | 10.2 | Equiaxial | — | Exist | 9 | >1000 |
| 11 | ZrO₂ | Sm₂O₃ | 8 | <0.01 | <0.01 | 10.8 | Equiaxial | — | Exist | 10 | >1000 |
| 12 | ZrO₂ | Sc₂O₃ | 8 | <0.01 | <0.01 | 10.4 | Equiaxial | — | Exist | 10 | >1000 |
| 13 | ZrO₂ | Y₂O₃ | 3 | <0.01 | <0.01 | 10.5 | Equiaxial | — | Exist | 10 | >1000 |
| 14 | ZrO₂ | Y₂O₃ | 12 | <0.01 | <0.01 | 10.5 | Equiaxial | — | Exist | 10 | >1000 |
| 15 | ZrO₂ | Y₂O₃ | 8 | <0.01 | <0.01 | 10.5 | Equiaxial | — | Exist | 9 | 700-800 |
| 16 | ZrO₂ | Y₂O₃ | 8 | <0.01 | <0.01 | 10.5 | Equiaxial | — | Exist | 9 | >1000 |
| 17 | ZrO₂ | Y₂O₃ | 8 | <0.01 | <0.01 | 10.5 | Equiaxial | — | No | 9 | >1000 |
| 18 | ZrO₂ | Y₂O₃ | 8 | <0.01 | <0.01 | 10.5 | Equiaxial | — | No | 10 | 900-1000 |
| 19 | ZrO₂ | Y₂O₃ | 8 | <0.01 | <0.01 | 10.5 | Equiaxial | — | No | 10 | 800-900 |
| 20 | ZrO₂ | Y₂O₃ | 8 | <0.01 | <0.01 | 10.5 | Equiaxial | — | Exist | 11 | >1000 |
| 21 | ZrO₂ | Y₂O₃ | 8 | <0.01 | <0.01 | 10.5 | Equiaxial | — | Exist | 12 | >1000 |
| * 22 | ZrO₂ | Y₂O₃ | 8 | <0.01 | <0.01 | 10.5 | Equiaxial | — | Exist | 10 | 100-200 |
| * 23 | ZrO₂ | Y₂O₃ | 8 | <0.01 | <0.01 | 10.5 | Equiaxial | — | Exist | 11 | 100-200 |
| * 24 | ZrO₂ | Y₂O₃ | 8 | <0.01 | <0.01 | 10.5 | Equiaxial | — | Exist | 10 | 100-200 |
| 25 | ZrO₂ | Y₂O₃ | 8 | <0.01 | <0.01 | 10.5 | Equiaxial | — | Exist | 9 | >1000 |
| 26 | ZrO₂ | Y₂O₃ | 8 | <0.01 | <0.01 | 10.5 | Equiaxial | — | Exist | 9 | >1000 |
| 27 | ZrO₂ | Y₂O₃ | 8 | <0.01 | <0.01 | 10.5 | Equiaxial | — | Exist | 9 | >1000 |
| 28 | ZrO₂ | Y₂O₃ | 8 | <0.01 | <0.01 | 10.5 | Equiaxial | — | Exist | 9 | >1000 |

Sample marked '*' is out of the scope of the present invention.
(1) Crack in surface corrosion-resistant layer It will be noted from Table 1 that in Sample Nos. 22 to 24 each having no crack extension preventing layer, the coating layer had peeling under 200 thermal shock tests. On the other hand, in Sample Nos. 1 to 21 and Nos. 25 to 28, which are within the scope of the invention, the thermal shock resistance is significantly improved compared to Sample Nos. 22 to 24. Particularly in Sample Nos. 1 to 14, 16, 17, 20, 21, and 25 to 28, in which the respective layers have a film thickness of 10 to 100 μm, the coating layer causes no peeling from the ceramic substrate after the 1000-cycle thermal shock tests. This shows that these samples are extremely excellent in thermal shock resistance such as in a heat cycle.

What is claimed is:

1. A corrosion-resistant silicon nitride ceramics in which a surface corrosion-resistant layer composed mainly of zirconium oxide stabilized by an element of the group 3a of the periodic table is laminated via an intermediate layer on a ceramic substrate composed mainly of silicon nitride,
wherein the intermediate layer comprises a stress relaxing layer and a crack extension preventing layer that are laminated in this order on the ceramic substrate, and that satisfy the following relational expressions (II) and (III):

$$\alpha_3 < \alpha_2 \quad (II)$$

$$\alpha_3 < \alpha_4 \quad (III)$$

wherein $\alpha_2$ is the thermal expansion coefficient of the stress relaxing layer; $\alpha_3$ is the thermal expansion coefficient of the crack extension preventing layer; and $\alpha_4$ is the thermal expansion coefficient of the surface corrosion-resistant layer.

2. A corrosion-resistant silicon nitride ceramics in which a surface corrosion-resistant layer composed mainly of zirconium oxide stabilized by an element of the group 3a of the periodic table is laminated via an intermediate layer on a ceramic substrate composed mainly of silicon nitride,
wherein the intermediate layer comprises an adhesion enhancing layer, a stress relaxing layer and a crack extension preventing layer that are laminated in this order on the ceramic substrate, and that satisfy the following relational expressions (I) to (III):

$$\alpha_0 \approx \alpha_1 \quad (I)$$

$$\alpha_3 < \alpha_2 \quad \text{(II)}$$

$$\alpha_3 < \alpha_4 \quad \text{(III)}$$

wherein $\alpha_0$ is the thermal expansion coefficient of the ceramic substrate; $\alpha_1$ is the thermal expansion coefficient of the adhesion enhancing layer; $\alpha_2$ is the thermal expansion coefficient of the stress relaxing layer; $\alpha_3$ is the thermal expansion coefficient of the crack extension preventing layer; and $\alpha_4$ is the thermal expansion coefficient of the surface corrosion-resistant layer.

3. The corrosion-resistant silicon nitride ceramics according to claim 2, wherein, the thermal expansion coefficient $\alpha_0$ of the ceramic substrate, the thermal expansion coefficient $\alpha_2$ of the stress relaxing layer, and the thermal expansion coefficient $\alpha_4$ of the surface corrosion-resistant layer satisfy the following relational expression (IV):

$$\alpha_0 < \alpha_2 < \alpha_4 \quad \text{(IV)}.$$

4. The corrosion-resistant silicon nitride ceramics according to claim 2, wherein, the thermal expansion coefficient $\alpha_0$ of the ceramic substrate and the thermal expansion coefficient $\alpha_3$ of the crack extension preventing layer satisfy the following relational expression (V):

$$|\alpha_3 - \alpha_0| \leq 1.5 \times 10^{-6}/°\text{C} \quad \text{(V)}.$$

5. The corrosion-resistant silicon nitride ceramics according to claim 1 or 2, wherein the crack extension-preventing layer has a thickness of 5 to 200 μm.

6. The corrosion-resistant silicon nitride ceramics according to claim 1 or 2, wherein the surface corrosion-resistant layer has a thickness of 5 to 200 μm.

7. The corrosion-resistant silicon nitride ceramics according to claim 1 or 2, wherein the surface corrosion-resistant layer comprises a columnar crystal, the long axis of the columnar crystal being substantially perpendicular to the surface of the ceramic substrate.

8. The corrosion-resistant silicon nitride ceramics according to claim 1 or 2, wherein the surface corrosion-resistant layer has a total Al and Si content of not more than 1 mass %, and a porosity of 1 to 30%.

9. The corrosion-resistant silicon nitride ceramics according to claim 1 or 2, wherein the surface corrosion-resistant layer has a crack.

10. The corrosion-resistant silicon nitride ceramics according to claim 9, wherein a crack coating layer for covering the crack of the surface corrosion-resistant layer is laminated on the surface corrosion-resistant layer.

11. A corrosion-resistant silicon nitride ceramics in which a surface corrosion-resistant layer composed mainly of zirconium oxide stabilized by an element of the group 3a of the periodic table is laminated via an intermediate layer on a ceramic substrate composed mainly of silicon nitride, wherein the intermediate layer comprises: (i) a stress relaxing layer composed mainly of a mixture of disilicate crystals of an element of the group 3a of the periodic table and zirconium oxide crystals stabilized by an element of the group 3a of the periodic table; and (ii) a crack extension preventing layer composed mainly of disilicate crystals of an element of the group 3a of the periodic table, the stress relaxing layer and the crack extension preventing layer being laminated in this order on the ceramic substrate.

12. A corrosion-resistant silicon nitride ceramics in which a surface corrosion-resistant layer composed mainly of zirconium oxide stabilized by an element of the group 3a of the periodic table is lamented via an intermediate layer on a ceramic substrate composed mainly of silicon nitride, wherein the intermediate layer comprises: (i) an adhesion enhancing layer composed mainly of disilicate crystals of an element of the group 3a of the periodic table; (ii) a stress relaxing layer composed mainly of a mixture of disilicate crystals of an element of the group 3a of the periodic table and zirconium oxide crystals stabilized by an element of the group 3a of the periodic table; and (iii) a crack extension preventing layer composed mainly of disilicate crystals of an element of the group 3a of the periodic table, the adhesion enhancing layer, the stress relaxing layer and the crack extension preventing layer being laminated in this order on the ceramic substrate.

13. The corrosion-resistant silicon nitride ceramics according to claim 11 or 12, wherein the disilicate crystals composing the crack extension preventing layer comprise at least one selected from $Er_2Si_2O_7$, $Yb_2Si_2O_7$, and $Lu_2Si_2O_7$.

14. The corrosion-resistant silicon nitride ceramics according to claim 11 or 12, wherein the crack extension preventing layer has substantially the same thermal expansion coefficient as the ceramic substrate.

15. The corrosion-resistant silicon nitride ceramics according to claim 2 or 12, wherein the adhesion enhancing layer and the stress relaxing layer have a thickness of 5 to 200 μm.

16. The corrosion-resistant silicon nitride ceramics according to claim 12, wherein the disilicate crystals composing the adhesion enhancing layer comprise at least one selected from $Er_2Si_2O_7$, $Yb_2Si_2O_7$, and $Lu_2Si_2O_7$.

* * * * *